UNITED STATES PATENT OFFICE.

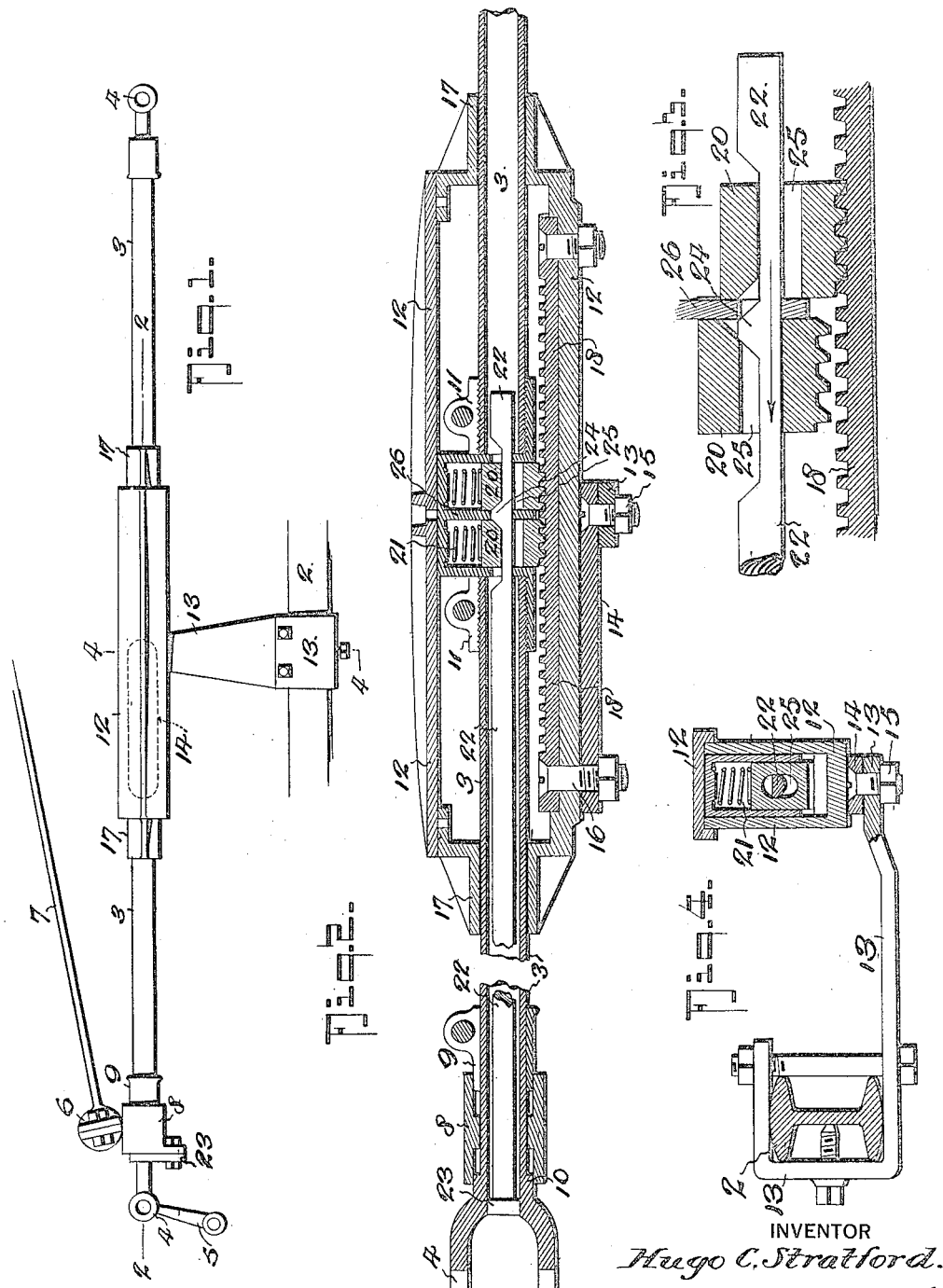

HUGO C. STRATFORD, OF VICTORIA, BRITISH COLUMBIA, CANADA.

AUTOMOBILE STEERING MECHANISM.

1,227,851. Specification of Letters Patent. Patented May 29, 1917.

Application filed November 25, 1916. Serial No. 133,416.

*To all whom it may concern:*

Be it known that I, HUGO C. STRATFORD, a citizen of the Dominion of Canada, residing at Victoria, in the Province of British Columbia, Canada, have invented certain new and useful Improvements in Aautomobile Steering Mechanisms, of which the following is a specification.

This invention relates to a means for automatically locking the steering gear of an automobile in any position to which it may be moved against movement imparted to it through the wheels, which locking means is released on movement imparted from the steering wheel to turn it from that position in either direction and is designed to prevent the steering position of the wheels from being disturbed by irregularities of the road, while leaving the driver full control in steering the vehicle.

Although particularly designed for vehicles of that class exemplified in the Ford machine, the essential feature of the invention may be applicable to any machine, as it permits of a quicker steering movement with absolute control of the wheels.

The invention is fully set forth in the following specification, reference being made to the drawings by which it is accompanied, in which:

Figure 1 is a plan showing the device as applied to the drag link and front axle of a machine of the Ford class.

Fig. 2 is a vertical longitudinal section of the same to an enlarged scale on the line 2—2 in Fig. 1.

Fig. 3, an enlarged detail of the locking pawls and rack, and

Fig. 4 is a cross section to an enlarged scale on the line 4—4 of Fig. 1.

In these drawings 2 represents the supporting axle of the leading wheels, 3 the tubular cross drag link of the steering mechanism which is connected at 4 at each end to the spindle arm 5 of each axle end.

Instead of the ball connection 6, to which the rod 7 from the steering wheel mechanism is connected, being rigidly attached to the drag link, as is usual, this ball connection is formed on a sleeve 8 which has a limited endwise movement on the drag link 3 between stops 9 and 10 secured on or integral therewith.

The drag link 3, instead of being in one piece from end to end, is made in two lengths which are connected adjacent the middle to a member 11. This member 11 is endwise movable within an elongated box or casing 12 which is rectangular in cross section and has a bearing 17 at each end through which the drag link 3 is movable. The casing 12 is connected to a bracket 13 clamped on the supporting axle 2, the connection being made by a link 14 pin-connected at 15 to the bracket and at 16 to the box or casing 12.

By this manner of connecting, the box 12 is prevented endwise movement in relation to the supporting axle 2 while the drag link and its connecting member 11 may move endwise in the box and the box is permitted by the link connection 14 to move to and from the axle as the drag link is moved endwise and swings on the radius of the spindle arms.

Secured within the box 12 to extend lengthwise of it is a fine toothed rack 18, and slidably mounted in the middle of the member 11 to move to and from the rack 18 are lock pawls 20 which are provided with teeth to engage those of the rack and are normally held in engagement with the rack teeth by springs 21.

The teeth of each lock pawl are formed to engage and retain a hold of the teeth of the rack against movement to the side on which the pawl is located, but are angled on the other face to slide over the teeth. With this provision, when both pawls are in engagement with the teeth of the rack the drag link cannot move endwise in either direction, but if one lock pawl is withdrawn from such engagement the drag link may be moved to that side as the other pawl will by the angle of its teeth move over the teeth of the rack.

The lock pawl on the side to which movement of the drag link is required to steer the vehicle is lifted from engagement with the rack to permit the required steering movement, by a rod 22 which is secured at 23 to the sleeve member 8, and the other end of this rod passes through apertures 25 in the lock pawls and is reduced on each side of the middle to leave a reversely angled portion 24 between the two pawls, which inclines engage a correspondingly angled corner of each pawl; so that endwise movement of the rod either way will effect withdrawal of the lock pawl on the side to which the rod 22 is moved. The reversely angled portion 24 of the rod is supported in this withdrawal of the pawls by its bearing in a mid feather 26 in the member 11.

The action of the device can now be ascertained: The lock pawls 20 being both normally held by their springs 21 in engagement with the teeth of the rack 18 and that rack being held against endwise movement by the link connection 14 of its box 12 to the bracket 13 which is secured to the supporting axle 2, the drag link 3 is securely held against movement either way which will disturb the alinement of the wheels for a straight course; but if movement is imparted in either direction by the rod 7 from the steering wheel mechanism to the sleeve 8 through the ball connection 6, that movement will first endwise move the sleeve 8 against one or other of its stops 9 or 10 of the drag link, and in that endwise movement will correspondingly move the rod 22 to withdraw the lock pawl on the side to which movement is required from engagement with the teeth of the rack. Further movement imparted to the sleeve 8 will effect movement of the drag link 3 to angle the wheels of the vehicle, as the teeth of the other pawl, owing to their angled faces on that side, will lift over the teeth of the rack bar but will prevent any backward movement which might be imposed on the steering mechanism by an obstruction on the road. As soon as the desired turn has been effected and movement of the steering wheel is reversed to straighten the vehicle on its new course, that reversed movement will allow the lock pawl on the side from which it is being moved to enter into engagement with the teeth of the rack 12 and will withdraw from such engagement the pawl on the side to which movement is made. When the wheels have been rectified on the straight course the slight oscillation of them will carry the sleeve 8 to the mid-position between its limiting stops 9 and 10 and the lock pawl, which was withdrawn, will automatically fall into engagement with the teeth of the rack and will secure the wheels against movement from the desired course.

It is particularly desired to emphasize the fact that the steering mechanism is unlocked only in the direction to which movement is being made and is locked against backward movement therefrom, and it is only unlocked to the extent which it is desired to move it, as it will automatically lock itself against movement beyond that to which it is moved.

Although the mechanism as set forth in the foregoing description effects the desired object and has worked in a satisfactory manner, I do not desire to be confined to the particular construction of it as described and illustrated, as the same may be modified within wide limits in adapting it to the practical requirements of machine shop practice without departing from the spirit of the invention, which resides in the provision of a means for automatically locking the steering mechanism against disturbance from the wheels in any desired position to which it is moved, which locking means is automatically released on movement from the steering wheel to change its position.

Having now particularly described my invention, I hereby declare that what I claim as new and desire to be protected in by Letters Patent, is:

1. In an automobile steering gear, the combination with the front axle and the drag link by which movement of the steering wheel is communicated to the axle ends, of means mounted on the drag link and connected with the axle for automatically locking the drag link in any desired position of its endwise movement, and means coöperative with movement of the steering wheel for releasing said locking means.

2. In an automobile steering gear, the combination with the supporting axle of the leading wheels and the drag link to which the rod from the steering wheel mechanism is connected for transmission of its movement to the spindle arms of the axle ends, of means mounted on the drag link and connected with the axle for automatically locking the drag link to the supporting axle against endwise movement, said means coöperative with movement of the rod from the steering wheel for releasing said drag link lock.

3. In an automobile steering gear, the combination with the drag link by which movement of the steering wheel is communicated to the axle ends, of means for automatically locking the drag link in any desired position of its endwise movement, said means comprising a toothed rack disposed parallel to the drag link and secured against endwise movement therewith by connection to the supporting axle, a pawl mounted in the drag link to be normally in engagement with the teeth of the rack but susceptible of being withdrawn from such engagement, and means coöperative with movement from the steering wheel for withdrawing said pawl from engagement with the teeth of the rack.

4. In an automobile steering gear, the combination with the drag link by which movement of the steering wheel is communicated to the axle ends, of means for automatically locking the drag link in any desired position of its endwise movement, said means comprising a toothed rack disposed parallel to the drag link and secured against endwise movement therewith by connection to the supporting axle, a pawl mounted in the drag link to be normally in engagement with the teeth of the rack but susceptible of being withdrawn from such engagement, and means coöperative with movement from the steering wheel for withdrawing said pawl from engagement with the teeth of the rack, said means comprising a sleeve having a limited endwise movement on the drag link to which sleeve the rod from the steering wheel is connected, and means connecting the sleeve to the pawl for lifting the pawl from engagement with the rack before the sleeve reaches the limit of its endwise movement on the drag link.

5. In an automobile steering gear, the combination with the drag link by which movement of the steering wheel is communicated to the axle ends, of means for automatically locking the drag link in any desired position of its endwise movement, said means comprising a toothed rack disposed parallel to the drag link and secured against endwise movement therewith by connection to the supporting axle, a pawl mounted in the drag link to move to and from engagement with the rack, said pawl having teeth corresponding to the rack but angled on one face to move over the teeth of the rack, and means coöperative with movement of the steering wheel to steer the vehicle for withdrawing the pawl from engagement with the teeth of the rack.

6. In an automobile steering gear, means for locking the same to prevent movement of the wheels from any position to which they are moved by the steering mechanism, said means comprising the combination with the supporting axle of the leading wheels and the drag link by which movement from the steering wheel is transmitted to the spindle arms of the axle ends, of a toothed rack connected to the supporting axle in a manner to prevent endwise movement in relation thereto, two pawls mounted in the drag link and having a normal tendency to engage the teeth of the rack but susceptible of being withdrawn from such engagement, one pawl preventing movement of the drag link in one direction and the other preventing movement in the opposite direction, means coöperative with movement of the steering wheel to turn the vehicle for withdrawing the pawl which prevents movement of the drag link as desired, said means comprising a sleeve having limited endwise movement mounted on the end of the drag link, to which sleeve the rod from the steering wheel is connected, and means connecting the sleeve to the pawls whereby movement of the sleeve in either direction against its limiting stop will withdraw the pawl which prevents movement of the drag link in that direction.

7. In an automobile steering gear, means for locking the same to prevent movement of the wheels from any position to which they are moved by the steering mechanism, said means comprising the combination with the supporting axle of the leading wheels and the drag link by which movement from the steering wheel is transmitted to the spindle arms of the axle ends, of a toothed rack connected to the supporting axle in a manner to prevent endwise movement in relation thereto, two pawls having teeth corresponding to those of the rack but the faces of which toward the adjacent pawl are angled to move over the teeth of the rack, said pawls being mounted in the drag link to move to and from engagement with the teeth of the rack, springs normally holding the pawls in engagement with the teeth of the rack, a rod passing through the pawls and having reversely inclined faces between the pawls to engage and withdraw one of the pawls from engagement with the teeth of the rack when endwise moved in either direction, the end of said rod being connected to a member slidable with a limited endwise movement on the drag link to which member the rod from the steering wheel is connected.

8. In an automobile steering gear, means for locking the same to prevent movement of the wheels from any position to which they are moved by the steering mechanism, said means comprising the combination with the supporting axle of the leading wheels and the drag link by which movement from the steering wheel is transmitted to the spindle arms of the axle ends, of an elongated box of rectangular cross section having a bearing at each end through which the drag link is endwise movable, a link pivotally connected at one end to the box and at the other end to a bracket secured to and projecting from the supporting axle of the leading wheels, said link parallel to the drag link and approximately in a vertical plane through its axis, a toothed rack extending lengthwise within the box, a pawl carrying member endwise movable in the rectangular box to which member the inner ends of the drag link are secured, toothed pawls mounted in this member to be movable to and from the rack bar, said pawls having teeth corresponding to those of the rack bar but angled on the sides which are toward the other pawl to move over the rack teeth, a spring holding each pawl in engagement with the teeth of the rack, a rod passing through the drag link and through an aperture in each pawl and provided with a reversely inclined portion which is normally between the pawls that when moved endwise either way will lift the pawl on the side to which it is moved from engagement with the teeth of the rack, the end of said rod being connected to a sleeve having a limited endwise movement on the end of the drag link to which sleeve the rod from the steering wheel is connected.

In testimony whereof I affix my signature.

HUGO C. STRATFORD.

Copies of this patent may be obtained for five cents each, by addressing the "Commissioner of Patents, Washington, D. C."